(12) United States Patent
Horsky et al.

(10) Patent No.: US 8,416,641 B2
(45) Date of Patent: Apr. 9, 2013

(54) ACOUSTIC DISTANCE MEASUREMENT SYSTEM HAVING CROSS TALK IMMUNITY

(75) Inventors: Pavel Horsky, Brno (CZ); Ivan Koudar, Modrice (CZ); Tomas Suchy, Brno (CZ)

(73) Assignee: Semiconductor Components Industries, LLC, Phoenix, AZ (US)

( * ) Notice: Subject to any disclaimer, the term of this patent is extended or adjusted under 35 U.S.C. 154(b) by 284 days.

(21) Appl. No.: 12/768,941

(22) Filed: Apr. 28, 2010

(65) Prior Publication Data

US 2011/0267924 A1 Nov. 3, 2011

(51) Int. Cl.
*G01S 15/00* (2006.01)

(52) U.S. Cl.
USPC .................................................. 367/99

(58) Field of Classification Search ........... 367/99, 367/123
See application file for complete search history.

(56) References Cited

U.S. PATENT DOCUMENTS

| 5,454,005 | A | * | 9/1995 | O'Clock et al. | 375/142 |
| 5,511,041 | A | * | 4/1996 | Michalski | 367/99 |
| 5,822,275 | A | * | 10/1998 | Michalski | 367/99 |
| 6,490,226 | B2 | | 12/2002 | Iwasaki et al. | |
| 7,004,031 | B2 | | 2/2006 | Oda et al. | |
| 2004/0110506 | A1 | * | 6/2004 | Dent | 455/437 |
| 2005/0062595 | A1 | * | 3/2005 | Hofbeck et al. | 340/457.1 |
| 2005/0135190 | A1 | | 6/2005 | Katou et al. | |
| 2006/0180377 | A1 | * | 8/2006 | Hofbeck et al. | 180/271 |
| 2006/0215492 | A1 | * | 9/2006 | Campbell | 367/99 |
| 2007/0241955 | A1 | | 10/2007 | Brosche et al. | |
| 2007/0274267 | A1 | * | 11/2007 | Tiedemann et al. | 370/335 |
| 2008/0229833 | A1 | * | 9/2008 | Asafusa et al. | 73/627 |
| 2009/0103656 | A1 | * | 4/2009 | Chen | 375/329 |
| 2009/0135672 | A1 | | 5/2009 | Matsuura et al. | |
| 2009/0212997 | A1 | * | 8/2009 | Michalski | 342/137 |
| 2010/0103811 | A1 | * | 4/2010 | Lozach et al. | 370/208 |

FOREIGN PATENT DOCUMENTS

WO   WO 2008122744 A1 * 10/2008

OTHER PUBLICATIONS

European Patent Office Search Report, dated Apr. 4, 2012.

* cited by examiner

*Primary Examiner* — Isam Alsomiri
*Assistant Examiner* — James Hulka
(74) *Attorney, Agent, or Firm* — Scott M. Garrett; Patents on Demand, P.A.

(57) ABSTRACT

In one embodiment, an acoustic distance measurement system can use a modulation pattern to modulate a carrier wave. The modulated carrier wave may be transmitted to an acoustic transducer. An echo of the transmitted signal can be detected by correlating the received signal with the modulation pattern. Subsequent to detecting sufficient correlation between the received signal and modulation pattern, a distance determination can be made to determine the distance to the object that produced the received echo.

20 Claims, 5 Drawing Sheets

FIG. 7 shows a flow chart diagram of a method in accordance with an embodiment.

ACOUSTIC DISTANCE MEASUREMENT SYSTEM HAVING CROSS TALK IMMUNITY

FIELD OF THE INVENTION

The invention relates generally to acoustic distance measurement systems, and more particularly to reducing cross talk from other nearby measurement systems or among transmitters of the same measurement system.

BACKGROUND OF THE INVENTION

Acoustic measurement systems are used in a wide variety of applications, including industrial applications; such as in manufacturing, motion detection for security systems, and increasingly in automotive applications, among others. In automotive applications acoustic measurement can be used for detecting the distance, as well as the rate of change of distance, between the vehicle and objects in the vicinity of the vehicle. This is particularly useful in collision warning/avoidance applications and parking assist applications. Acoustic pulses are transmitted from the vehicle and any obstacles within sufficient range reflect the acoustic pulses. The echo time and Doppler frequency shift of the reflected pulse can be used to derive information about the distance to the object as well as whether the object is moving towards or away from the vehicle, and at what rate.

As the use of acoustic distance measurement systems increases in vehicular applications, there is an increasing chance that vehicles using such systems will interfere with each other's systems. Vehicles using the same or similar frequencies in proximity to each other will experience "cross talk," which occurs when one vehicle receives acoustic signals from another vehicle and is unable to distinguish the signal from its own signal. Such cross talk can result in false detections, resulting in incorrect distance and Doppler shift measurements, compromising the effectiveness of collision alert/avoidance systems. Furthermore, there can be a significant amount of acoustic noise in automotive and other applications which affects the effectiveness of acoustic receivers. Accordingly, there is a need for a means by which the effect of cross talk can be suppressed.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE DRAWINGS

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

An acoustic distance measurement system generates a time limited (pulsed) stable carrier wave and modulates the carrier wave according to a preselected modulation pattern. The modulation pattern is selected to ensure that it will be substantially unique and distinguishable among signals from other acoustic distance measurement systems in nearby proximity. The modulated carrier wave is amplified and used to drive an acoustic transducer to generate acoustic waves corresponding to the modulation pattern. Nearby objects reflect the acoustic waves as echoes. An echo will exhibit the same modulation pattern when received at the acoustic transducer. Accordingly, the acoustic transducer is monitored subsequent to transmitting the signal to detect echoes. As the acoustic distance measurement system is receiving at the acoustic transducer, the received signal is processed in a receiver of the acoustic distance measurement system. The received signal can be demodulated and the demodulated signal applied to one or more correlators used to detect the modulation pattern. When the modulation pattern is detected, a distance to the object responsible for the echo can be determined. This process can be arbitrarily repeated to capture multiple echo sequences.

Figure 1:
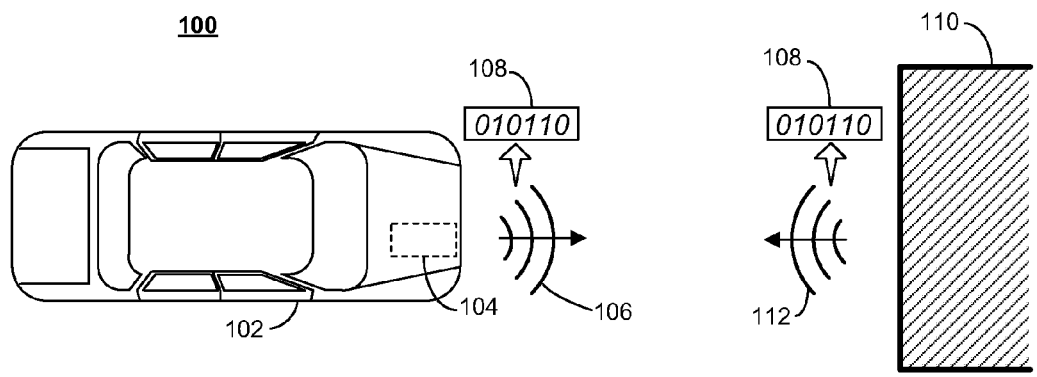
FIG. 1 shows a vehicular application of an acoustic distance measurement system in accordance with an embodiment.

Referring to FIG. 1, there is shown a vehicular application 100 of an acoustic distance measurement system in accordance with an embodiment. There are an increasing number of vehicles being manufactured which use acoustic distance measurement systems. These systems can be used for applications such as parking assistance and collision warning/avoidance. A vehicle 102 includes an acoustic distance measurement system 104. The acoustic distance measurement system generally transmits acoustic bursts 106, typically in the audio spectrum beyond human hearing, known as the ultrasonic region. These bursts are reflected off objects 110 to create echoes 112. The echoes travel back to the acoustic distance measurement system which "hears" the echo, and based on echo parameters, such as echo return time, determines the distance between the vehicle 102 and the object 110.

Since there can be other vehicles nearby on the roadway that are also equipped with acoustic distance measurement systems, there is potential for the systems to interfere with each other due to cross talk of the signal. Furthermore, an increasing number of acoustic distance measurement systems use multiple transmitters, which can concurrently transmit, and care must be taken such that their signals do not interfere with each other. To avoid the problems of cross talk, the present acoustic distance measurement system uses a substantially unique modulation pattern to generate the transmitted signal. The modulation used is generally phase modulation, and more particularly digital phase modulation. In some applications both amplitude and phase modulation can be used, such as, for example, amplitude and phase shift keying (APSK), which is also referred to as asymmetric phase shift keying. Accordingly, the transmitted burst or pulse 106 uses a modulation pattern 108. An echo 112 produced by the transmitted modulated signal will exhibit the same modulation pattern. The modulation pattern can correspond to a digital sequence such as a binary sequence, which may be generated or selected by the acoustic distance measurement system, uniquely assigned upon manufacture of the acoustic distance measurement system, and so on. The modulation pattern can be selected from a predefined set of modulation patterns at the commencement of each burst, or it can be constant for a period of time or throughout the life of the system, or occasionally adjusted or changed, as may be necessary from time to time.

Figure 2:
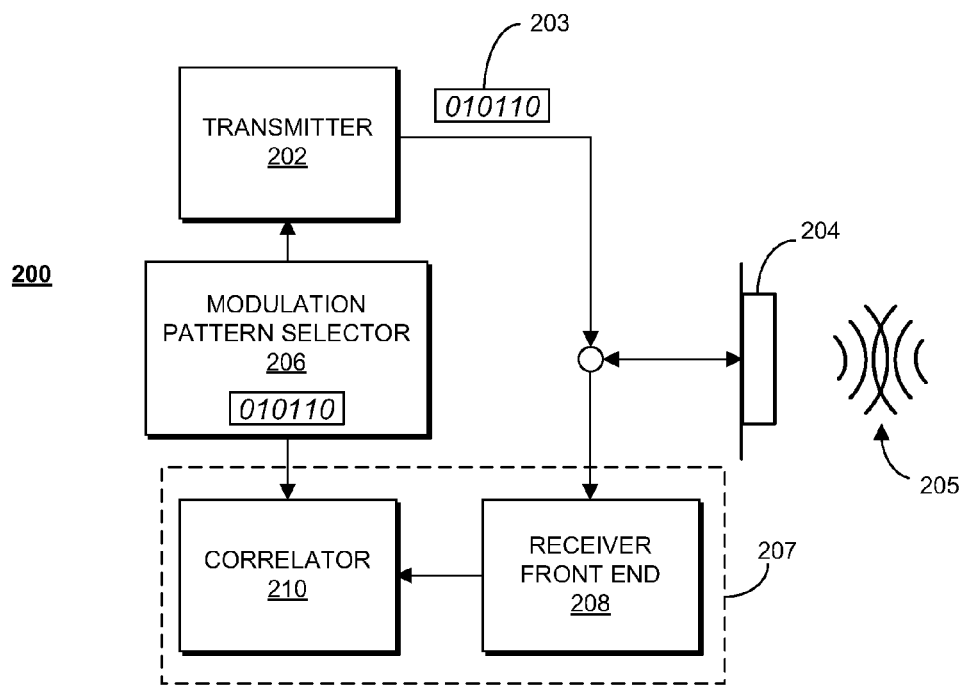
FIG. 2 shows a schematic block diagram of an acoustic distance measurement system in accordance with an embodiment.

FIG. 2 shows a schematic block diagram of an acoustic distance measurement system 200 in accordance with an embodiment. The acoustic distance measurement system includes a transmitter 202 which is operably coupled to an acoustic transducer 204, which is further operably coupled to a receiver 207. The phrase "operably coupled" means that they are electrically coupled so that signals at one component can be applied or otherwise evident at the other component or components.

The transmitter includes components, devices, processors, and circuits as necessary to generate a stable carrier wave, modulate the carrier wave during a pulse to be transmitted, and amplify the modulated carrier wave. The transmitter further controls transmit timing such as on and off times of the transmitted pulse or burst. The stable carrier wave may be generated by an oscillator of any known type, including direct digital synthesis, and generally has a constant amplitude and constant frequency. It can be adjusted from time to time and set to different frequencies as may be desired. The transmitter can modulate the carrier wave using phase modulation, such as APSK, according to a modulation pattern selected by modulation pattern selector 206, provided to the transmitter. The modulation pattern can be a bit sequence that is selected from a group of mutually orthogonal bit sequences or codes, such as those known as Walsh codes or Gold codes. Other digital sequences may be used, as is known. The modulation pattern can be selected to optimize frequency spectrum distribution of the resulting driving signal and yield good autocorrelation properties and cross correlation rejection. The modulator can use, for example APSK, binary phase shift keying (BPSK), or any other suitable modulation. The modulated carrier is amplified to produce a driving signal 203 which includes the modulation pattern selected by modulation pattern selector 206. The driving signal is a time limited burst of the stable carrier signal which is modulated with the modulation pattern. Such a signal drives the acoustic transducer 204 to create acoustic signals or waves 205 which will be reflected by nearby objects as echoes.

The echoes, which will have a much smaller amplitude, are incident on the acoustic transducer which causes the acoustic transducer to generate an electric signal corresponding to the received echo signal. Once the transmitter ceases transmitting at the end of a pulse, the receiver can commence processing the received signal produced by the acoustic transducer as a result of the echo signal being incident on the transducer. A front end of the receiver is responsible for amplifying and filtering the received signal and can further apply the received signal to a demodulator of the receiver. The demodulated signal can be processed by a correlator 210 which calculates a correlation measure between the received, demodulated signal and the modulation pattern 206. When a sufficient correlation is found, it indicates reception of an echo and based on characteristic of the echo signal, such as time of reception relative to transmit time, the distance to the object responsible for the echo can be determined. Furthermore, in systems which use multiple transmitters and multiple receivers, where each transmitter uses a unique modulation pattern, the time of arrival of each transmitted modulation pattern at each receiver can be used in triangulation to determine distance as well as direction of an object.

Figure 3:
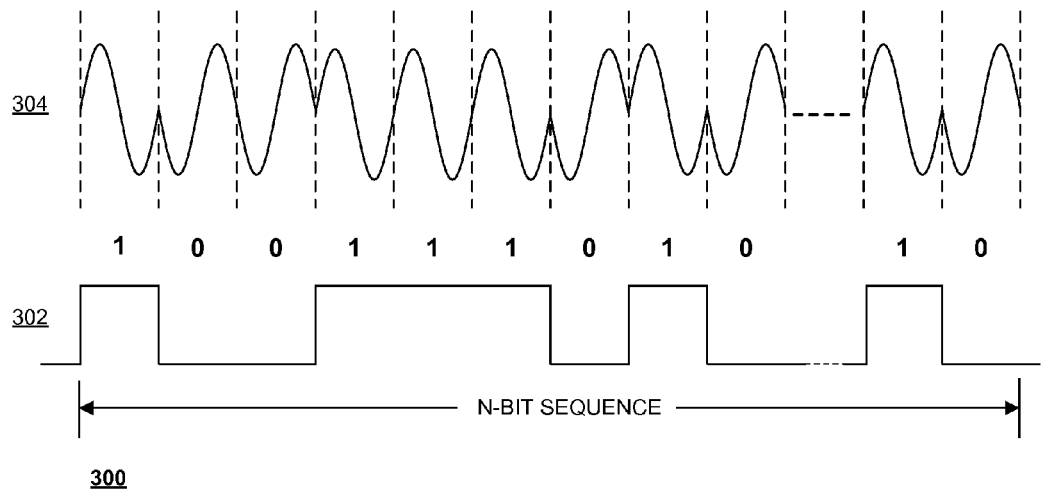
FIG. 3 shows a modulation diagram of an exemplary carrier wave modulated for use in an acoustic measurement system in accordance with an embodiment.

FIG. 3 shows a modulation diagram 300 of carrier wave modulated for use in an acoustic measurement system in accordance with an embodiment. A modulation pattern 302 can be a bit sequence of N bits. The modulation pattern can be selected for each transmit pulse, or it may be a constant pattern that is uniquely assigned at the time of manufacture, or it may be otherwise adjustable as needed. As shown here, the modulation pattern corresponds to a digital bit sequence of 1's and 0's. The modulation pattern is used to phase modulate a carrier wave to produce a modulated carrier wave pulse 304. The modulation scheme illustrated here in 304 is BPSK, which produces a spread spectrum. As mentioned, other forms of phase modulation can be used, such as APSK. The modulation pattern can be selected or generated to provide minimal cross correlation and autocorrelation noise, as is known. As a result of producing a spread spectrum signal, the power spectral density compared to other systems using, for example, no modulation, is lowered, which tends to prevent other nearby transmitters using the invention from dominating any portion of the spectrum, and further lowering cross talk interference.

Figure 4:
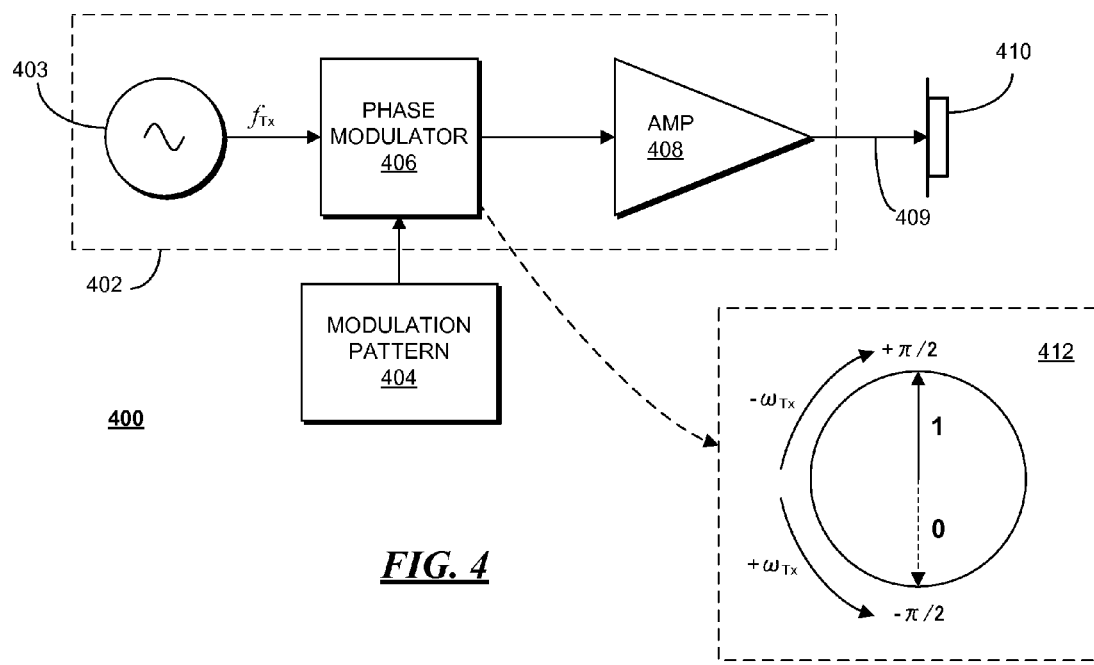
FIG. 4 shows a schematic block diagram of a transmitter section of an acoustic distance measurement system in accordance with an embodiment.

FIG. 4 shows a schematic block diagram of a transmitter section 400 of an acoustic distance measurement system in accordance with an embodiment. A transmitter 402 can include a carrier wave generator 403, a phase modulator 406, and an amplifier 408. The carrier wave generator produces a stable carrier signal $f_{Tx}$ which is provided to the phase modulator 406. A modulation pattern 404 is also provided to the phase modulator which modulates the carrier wave according to the modulation pattern to produce a modulated carrier wave or signal, which is provided to the amplifier 408. The amplifier provides power amplification of the modulated carrier to produce a driving signal 409 including the modulation pattern which drives the acoustic transducer 410. Timing control for the transmission pulse including the modulated carrier wave can be performed at the amplifier or at the phase modulator, or both. The phase modulator can be implemented by a digital signal processor that is programmed to operate in accordance with the present teachings. Using the example of BPSK modulation, a constellation diagram 412 is used, where a digital "1" can be at the $+\pi/2$ location on a reference radian circle, and a digital "0" can be located at the $-\pi/2$ location. For other forms of modulation, different constellation diagrams will result accordingly, as is well known. For example in APSK, unlike in BPSK, where there are only two constellation points having equal magnitude, there can be different magnitudes as well as different phase angles, providing a larger symbol set. Rather than transmitting a binary sequence of 1's and 0's, then, APSK allows transmitting digital words including multiple binary digits, an example of which would be the set {00, 01, 10, 11}.

Figure 5:
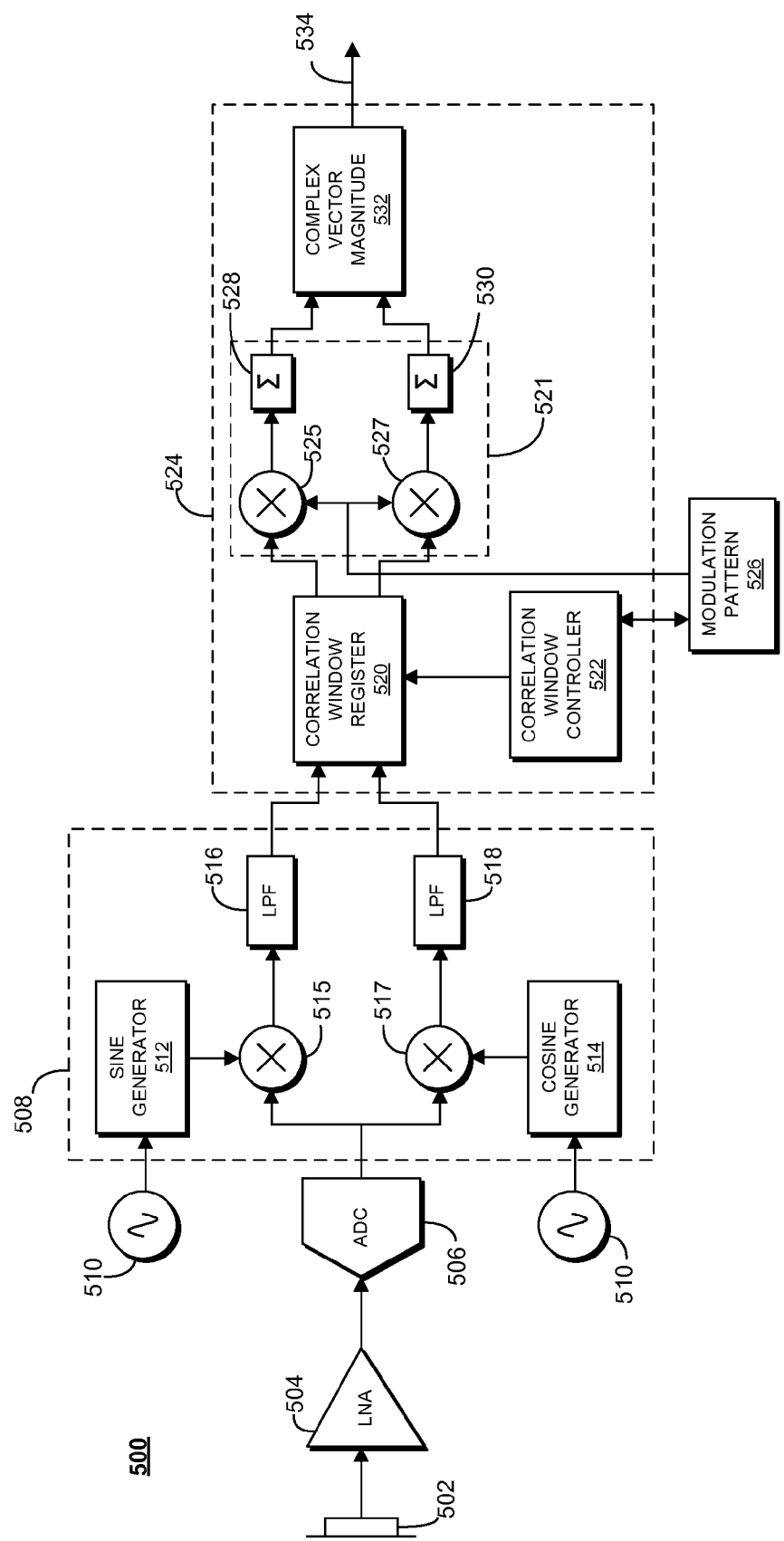
FIG. 5 shows a schematic block diagram of a receiver section of an acoustic distance measurement system in accordance with an embodiment.

FIG. 5 shows a schematic block diagram of a receiver section 500 of an acoustic distance measurement system in accordance with an embodiment. Upon transmitting the modulation pattern, the transmitter shuts off and a receive channel can then be enabled. Receiving is performed via the acoustic transducer 502 producing electrical signals corresponding to the acoustic vibrations incident on the acoustic transducer. The received signals produced by the acoustic transducer are first amplified by a low noise amplifier 504 and eventually filtered, which produces an amplified signal that is digitized by an analog to digital converter (ADC) 506. The ADC produces a digitized version of the received signal which is fed to a demodulator 508. The demodulator can be a zero intermediate frequency (ZIF) demodulator. The carrier wave 510, which is the same carrier wave as supplied to the transmitter, is supplied to a sine generator 512 and a cosine generator 514. The sine and cosine generators produce signals that are orthogonal with respect to each other, and which are fed to digital multipliers 515, 517 respectively. The multipliers each multiply the digitized received signal with the sine and cosine signals, and the output of the multipliers are filtered by low pass filters (LPFs) 516, 518, respectively. This complete operation represents frequency mixing.

The output of the demodulator 508 from LPFs 516, 518 is a complex vector stream that is fed to a correlation window register 520 in a correlator unit 524. The correlation window register can be a shift register which shifts in successive components of the complex vector produced by the demodulator, under control of the correlation window controller 522, which controls shift timing and other operations. The contents of the correlation window register can be periodically correlated against the modulation pattern 526 in a complex correlator 521 by shifting the contents of the correlation window register out to the complex correlator 521. The complex correlator includes multipliers 525, 527 and accumulators 528, 530. As a result, a complex correlation is calculated between the demodulated received signal and modulation pattern. A magnitude of the complex vector is calculated in a complex vector magnitude unit 532 and is compared to a predefined correlation threshold. The output 534 of the complex vector magnitude unit indicates when correlation has been detected, meaning the present contents of the correlation window register correlate to an echo from the transmitted driving signal. The components of the correlator unit 524 and demodulator 508 can be implemented by a digital signal processor operating according to instruction code designed to perform the operations and functions as substantially described. Once sufficient correlation is detected, the acoustic distance measurement system can then determine, based on timing, the distance to the object that produced the echo. Furthermore, the correlator unit can include a plurality of correlators, each using a different modulation pattern for applications where an acoustic distance measurement system uses multiple transmitters, each using a different modulation pattern. Equivalently, each of the different modulation patterns used by the plurality of transmitter can be applied to the complex correlator after each shift, with accumulator totals saved in appropriate registers for each modulation pattern correlation.

Figure 6:
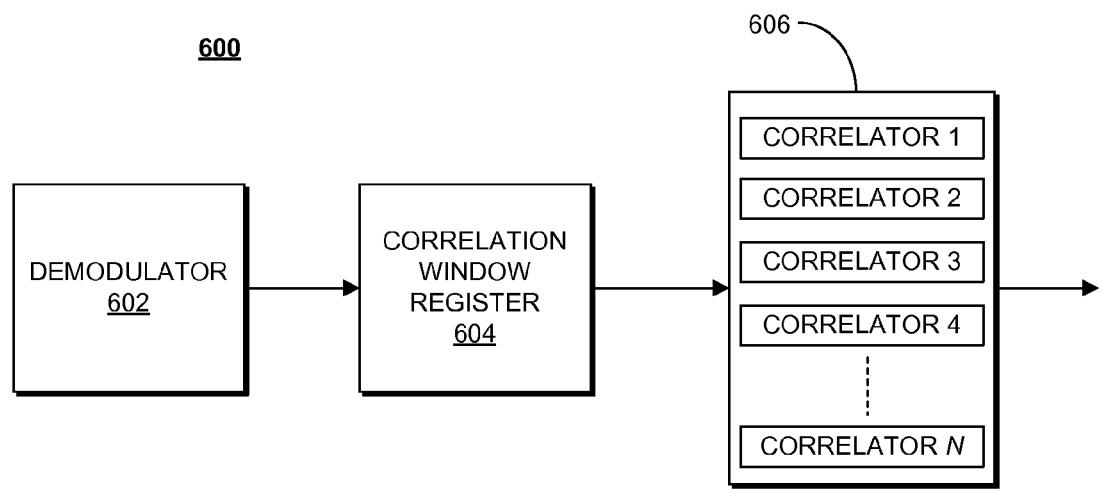
FIG. 6 shows a schematic block diagram of a receiver section utilizing multiple correlators in accordance with an embodiment.

FIG. 6 shows a schematic block diagram of a receiver section 600 utilizing multiple correlators in accordance with an embodiment. The present receiver lineup can be used to detect echoes from multiple different transmitters of the acoustic distance measurement system, each using a unique modulation pattern. A demodulator 602 produces the complex vector as described in reference to FIG. 5. The correlation window register stores a shifted sequence of vector components produced by the demodulator. The contents of the correlation window register can then be applied to a plurality of correlators 606, where each correlator uses a different modulation pattern corresponding to a modulation patterns used by one of the transmitters. Each correlator can correspond to a specific modulation pattern, which can be recognized from among the other modulation patterns used in the acoustic distance measurement system. Multiple modules from the same vehicle can transmit concurrently using the same frequency; each assigned a unique modulation pattern. In one embodiment the acoustic distance measurement system can employ multiple receivers where each receiver is equipped with set of correlators. Each correlator can thus determine to which module a given received echo corresponds.

Figure 7:
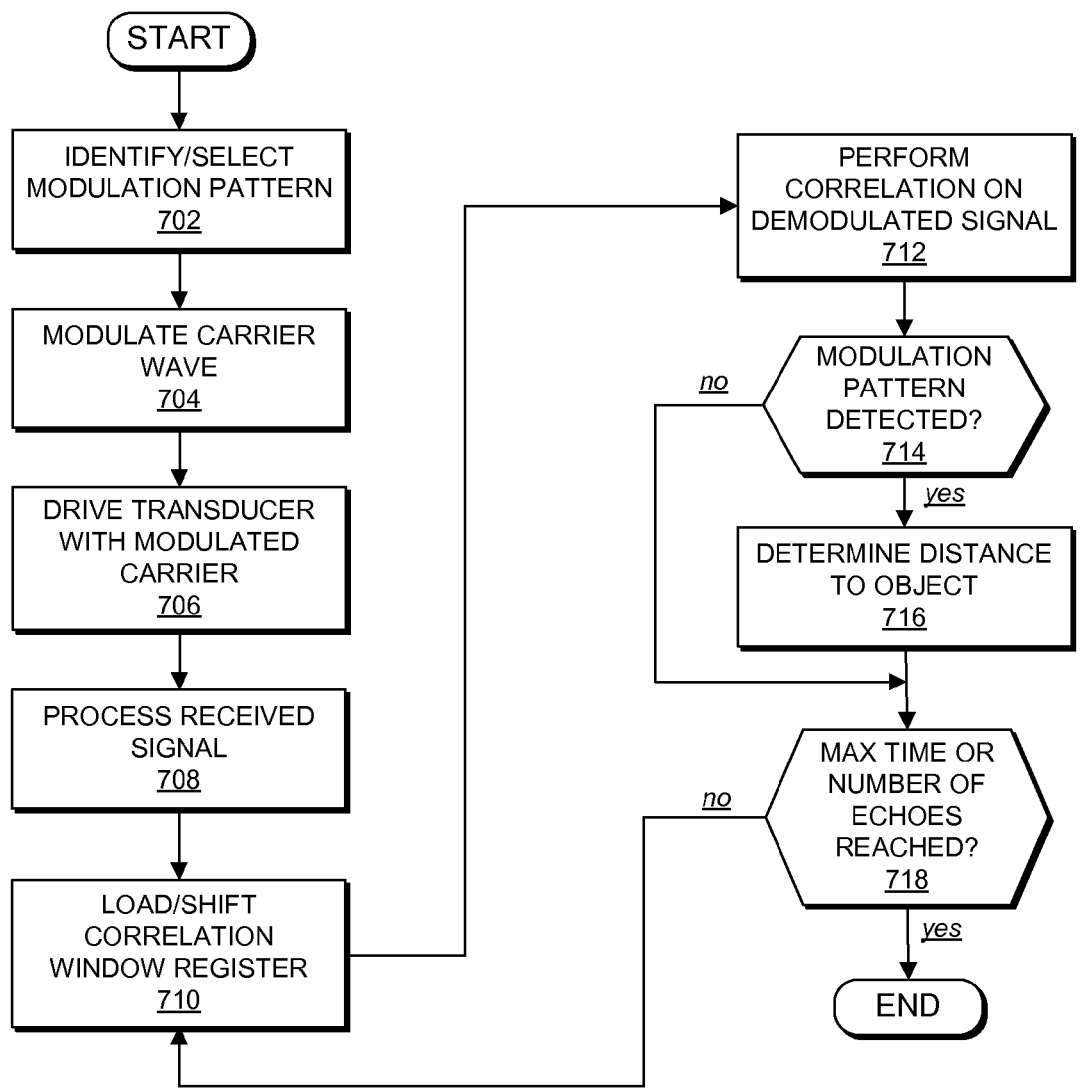
FIG. 7 shows a flow chart diagram of a method in accordance with an embodiment.

FIG. 7 shows a flow chart diagram 700 of a method for conducting ultrasonic distance measurements in accordance with an embodiment. The method can utilize the acoustic distance measurement system components as described in reference to FIGS. 1-6. At the start of the method, the acoustic distance measurement system is powered on and ready to operate. The method can commence upon the acoustic distance measurement system starting a distance measurement operation, and identifying or otherwise selecting a modulation pattern (702). The modulation pattern can be a bit sequence assigned to the acoustic distance measurement system upon manufacture of the acoustic distance measurement system, or it may be generated by the acoustic distance measurement system, or it may be selected or randomly selected from a group of predefined modulation patterns. For example, the modulation pattern may be randomly selected from a predefined group of codes such as Walsh codes or Gold codes. In one embodiment the modulation patterns used by the acoustic distance measurement system are mutually sufficiently orthogonal. In some applications, where correlation properties such as cross correlation and autocorrelation noise are important considerations, the modulation pattern may be one of a plurality of modulation patterns which produce sufficient correlation properties, and spectrum utilization such that the spectral distribution is sufficiently flat inside the defined baseband.

Once the modulation pattern is identified, it is used to phase modulate a carrier wave (704) to produce a modulated carrier wave. The carrier wave is typically at an ultrasonic frequency. The modulated carrier is used to produce a driving signal to drive an acoustic transducer (706). The driving signal has a substantial pulse characteristic in that it is turned on upon, or just prior to commencement of modulating the carrier wave with the modulation pattern, and turned off after the modulation pattern has been transmitted. Once the modulation pattern is transmitted, the transmitter shuts off, allowing the acoustic distance measurement system to enable a receive channel and begin processing the received signal (708), monitoring the signal produced by the acoustic transducer. The received signal can be processed by digitizing it and applying the digitized received signal to a demodulator such as a ZIF demodulator to produce a demodulated signal. Such a demodulated signal represents a complex vector stream having real and imaginary components, each of which are buffered in separate registers of a register pair. Output of this register pair is shifted into the correlation window register (710). The shift timing can be based on a clock signal derived from the modulator clock. A shifting time segment of the demodulated signal is loaded into the correlation window register (710), which is maintained and periodically applied to a correlator (712) which correlates the time segment of the demodulated signal with the modulation pattern to determine if there is sufficient correlation (714). If sufficient correlation is detected, then the acoustic distance measurement system can determine a distance to the object that produced the received echo (716). If no modulation pattern was detected at process 714, or after determining the distance to an object based on a detected echo, the method can then determine if a maximum time has passed for the present iteration of the method, or if a preselected number of echoes has been detected (718). A number of different echoes may be detected, for example, when multiple transmitters, each using different modulation patterns, are used by the acoustic distance measurement system. Generally arbitrary selected number of echoes can cover set of detected obstacles using multiple transmitters. If the maximum time has been reached or the preselected number of echoes detected, the method for the present iteration ends. The method can be repeated as desired, either at preselected intervals or upon occurrence of particular events, such as engaging a reverse gear of the vehicle, reaching a particular speed, and so on. If the present iteration of the method is not complete, due to the maximum time not being reached or the preselected number of echoes has not been detected, the method returns to further process the received signal by shifting in a new portion of demodulated signal (710), and consequently shifting out the oldest portion of demodulated signal in the correlation register.

The invention can be embodied in other forms aside from the various embodiments and examples shown without departing from the spirit or essential attributes thereof. In particular, the invention can be implemented using computer usable instruction code stored on a tangible computer readable storage medium which, when executed by a processor, causes the processor to control system elements to perform operations and functions as described herein and as illustrated in the accompanying drawings. The invention can be embodied as an apparatus, a method, a system, and a computer program product comprising computer instruction code disposed in a tangible computer readable storage medium. Accordingly, reference should be made to the following claims, rather than to the foregoing specification, as indicating the scope of the invention.

What is claimed is:

1. A method for forming a vehicular distance measurement system including a plurality of modules, each module including an ultrasonic transducer and an ultrasonic distance measurement circuit, comprising:
    configuring each ultrasonic distance measurement circuit to select a modulation pattern that is a binary sequence, the digital sequence being one of a plurality of binary sequences used by the plurality of modules, wherein each module uses a different one of the plurality of binary sequences;
    configuring each ultrasonic distance measurement circuit to modulate a carrier wave using phase shift key modulation in a pulse to produce a modulated driving signal, the phase shift key modulation corresponding to the selected digital sequence;
    configuring each ultrasonic distance measurement circuit to concurrently output the modulated driving signal to the ultrasonic transducer of the module;
    configuring each ultrasonic distance measurement circuit to receive a signal from the ultrasonic transducer of the module;
    configuring each ultrasonic distance measurement circuit to concurrently provide the signal received from the ultrasonic transducer of the module to a plurality of modulation pattern specific correlators of the module, wherein each one of the plurality of modulation pattern specific correlators compares the received signal to a different digital sequence of the plurality of digital sequences, wherein each of the different digital sequences correspond to one of the plurality of modules; and
    configuring each ultrasonic distance measurement circuit to concurrently detect echoes of driving signals concurrently transmitted by the plurality of modules using the plurality of correlators of the module.

2. The method of claim 1, wherein configuring each ultrasonic distance measurement circuit to select the modulation pattern comprises configuring each ultrasonic distance measurement circuit to select the modulation pattern from a group of predefined modulation patterns that are substantially mutually orthogonal.

3. The method of claim 1, wherein configuring each ultrasonic distance measurement circuit to select the modulation pattern comprises configuring each ultrasonic distance measurement circuit to select a modulation pattern that is assigned to the module of the performing the method.

4. The method of claim 1, wherein configuring each ultrasonic distance measurement circuit to select the modulation pattern comprises configuring each ultrasonic distance measurement circuit to select the modulation pattern from a group of Walsh codes.

5. The method of claim 1, wherein configuring each ultrasonic distance measurement circuit to modulate its carrier wave comprises configuring each ultrasonic distance measurement circuit to modulate its carrier wave using one of amplitude and phase shift keying modulation or binary phase shift keying modulation.

6. The method of claim 1, wherein configuring each ultrasonic distance measurement circuit to concurrently detect echoes of the driving signals comprises detecting an echo return time for each echo.

7. A vehicular acoustic distance measurement system comprising:
    a plurality of transmitters, each one of the plurality of transmitters including an acoustic transducer (204) and being operable to generate a driving signal comprised of a carrier wave that is phase shift key modulated according to a digital sequence that is orthogonal to that used by all other transmitters of the plurality of transmitters during a transmission pulse, and wherein each transmitter of the plurality of transmitters is configured to provide its driving signal to an acoustic transducer dedicated to that transmitter, concurrently with the other transmitters of the plurality of transmitters;
    a plurality of receivers, each one of the plurality of receivers operable to receive signals from a different one of the acoustic transducers each receiver comprising a plurality of correlators which operate concurrently, wherein each correlator of each receiver concurrently correlates a received signal to a different one of the digital sequences to detect an echo signal including one of the digital sequences; and
    a distance measuring unit coupled to the receiver which determines a distance to an object that produced the echo including the one of the digital sequences based on an echo return time of the echo containing the one of the digital sequences.

8. The vehicular acoustic distance measurement system of claim 7, wherein the transmitter comprises an amplitude and phase shift keying modulator.

9. The vehicular acoustic distance measurement system of claim 7, further comprising a modulation pattern selector which selects the digital sequence.

10. The vehicular acoustic distance measurement system of claim 9, wherein the digital sequence is selected from a group of digital sequences that are substantially mutually orthogonal and have a predetermined length.

11. The vehicular acoustic distance measurement system of claim 10, wherein the modulation pattern selector selects a new digital sequence at preselected time intervals.

12. The vehicular acoustic distance measurement system of claim 7, wherein the receiver includes a zero intermediate frequency (ZIF) demodulator, the received signal is demodulated by the ZIF demodulator and producing a complex vector output which is shifted into each of the plurality of correlation shift registers.

13. The vehicular acoustic distance measurement system of claim 7, wherein the digital sequence is selected from a plurality of Walsh codes.

14. The vehicular acoustic distance measurement system of claim 7, wherein the distance measurement unit determines which of the plurality of transmitters transmitted the echo signal based on which of the plurality of correlators matches the digital sequence in the echo signal.

15. A method for suppressing acoustic cross talk in an acoustic vehicular distance measurement system, the system including a plurality of modules, each module including a transmitter, a receiver, and an acoustic transducer coupled to the transmitter and the receiver, each receiver having a plurality of correlators, the method comprising:
 selecting, in each module, a modulation pattern for the transmitter, the modulation pattern being unique and orthogonal with respect to the modulation patterns used by each of the other modules;
 transmitting, concurrently by each transmitter, a modulated signal from each transmitter, the modulated signal produced by phase shift key modulating a carrier wave according to the modulation pattern during a transmission pulse;
 concurrently receiving, at the receiver of each module via the transducer, a signal, and applying the signal to the plurality of correlators, each correlator correlating the signal with a different modulation pattern corresponding to one of the modules and upon detecting a modulation pattern in the signal at one of the correlators, determining an echo return time of an echo in the signal using the modulation pattern; and
 determining a distance to the receiver based on the echo return time of an object that produced the echo.

16. The method of claim 15, wherein the modulation pattern is a predefined bit sequence selected from a plurality of substantially mutually orthogonal bit sequences.

17. The method of claim 16, wherein transmitting the modulated signal comprises modulating the carrier wave using amplitude and phase shift keying of the carrier wave according to the predefined bit sequence.

18. The method of claim 15, wherein the modulation pattern is one of a plurality of modulation patterns assigned to the acoustic vehicular distance measurement system.

19. The method of claim 15, wherein detecting the modulation pattern at each receiver comprises:
 enabling a receive channel of the receiver to monitor a received signal from an acoustic transducer;
 demodulating the received signal to produce a demodulated signal;
 performing a continuous correlation operation on the demodulated signal using each of the plurality of correlators concurrently; and
 determining that a portion of the demodulated signal substantially correlates with the modulation pattern of one of the plurality of correlators.

20. The method of claim 19, wherein demodulating the received signal is performed using a zero intermediate frequency demodulator.

* * * * *